June 24, 1924.
R. McNABB
1,498,634
CONTROL ROD FOR PET COCKS
Filed May 18, 1923
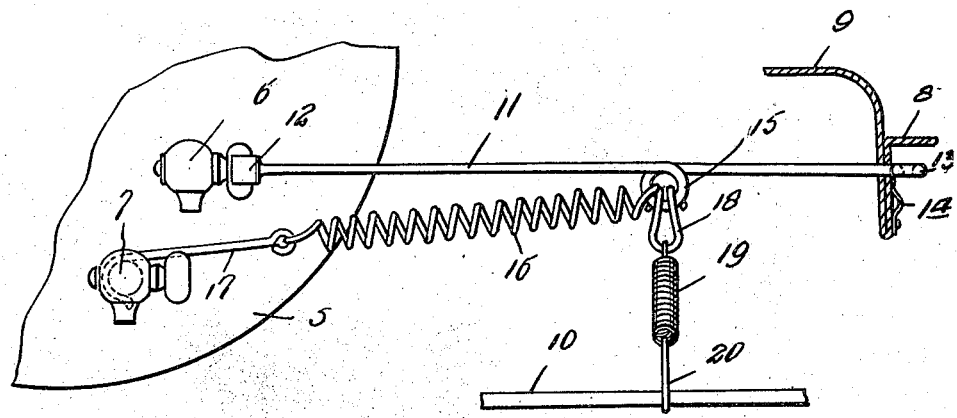
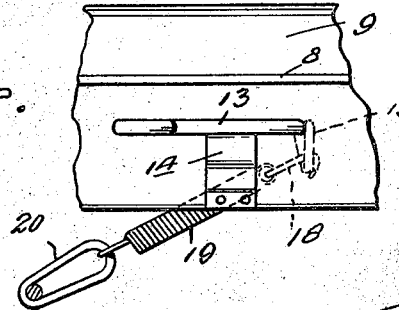
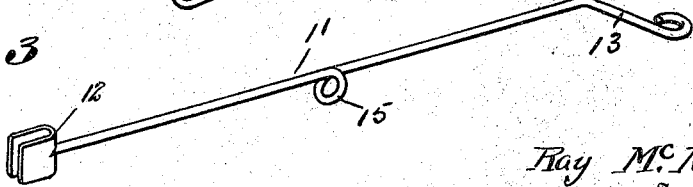

Patented June 24, 1924.

1,498,634

UNITED STATES PATENT OFFICE.

RAY McNABB, OF ARCOLA, ILLINOIS.

CONTROL ROD FOR PET COCKS.

Application filed May 18, 1923. Serial No. 639,936.

*To all whom it may concern:*

Be it known that RAY McNABB, a citizen of the United States, residing at Arcola, in the county of Douglas and State of Illinois, has invented certain new and useful Improvements in Control Rods for Pet Cocks, of which the following is a specification.

In carrying out the present invention it is my purpose to provide a control rod for the pet cocks of combustion engine crank cases whereby the same may be easily and expeditiously opened for determining the oil supply within the crank case.

The primary object of this invention is the provision of a control rod that is adapted to be so connected to the uppermost one of the crank case pet cocks of an automobile engine as to become a permanent attachment of the vehicle carrying said engine, whereby the operator thereof may at all times open and close this pet cock without the usual necessity of getting beneath the car and operating the pet cock directly by hand.

A still further object of the invention is to provide a control rod for crank case pet cocks wherein the same is adapted to be moved in one direction for opening the cock and whereby means is provided for automatically returning the rod to its normal position and for consequently closing the pet cock upon the releasing of said rod.

A still further object of the invention is the provision of such a device that may be so attached to motor vehicles as to become an associate part therewith and one that may be attached in a novel, simple and expeditious manner, the installation of which will entail but a slight cost.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:—

Figure 1 is a fragmentary cross-section through a conventional form of a motor vehicle with certain parts removed and showing the application of my improved control rod, Figure 2 is a fragmentary side elevation of one of the running boards of the vehicle equipped with my improved control rod, and Figure 3 is a perspective of the control rod per se.

Referring to the drawing, 5 designates the crank case of a vehicle equipped with upper and lower pet cocks 6 and 7, respectively. 8 designates one of the running boards of the vehicle, 9 the usual metal skirt between the running board and vehicle body and 10 one of the brace rods for the fenders. These elements constitute no part of the present invention as the same are included in practically all types of motor vehicles and are merely shown for permitting the disclosure of the relationship of my invention therewith.

My invention per se constitutes the provision of a rod 11 that is extended through an opening in the pendent portion of said running board 8 and is equipped at its inner end with a clamp 12 that engages over the usual flat operating knob of the uppermost pet cock 6. The opposite end of this rod 11 that is upon the outer side of the said running board flange is bent laterally at right angles for providing a control handle 13. Immediately beneath this handle 13 and upon the said flange of the running board is a spring plate 14 that serves as a stop for said handle. The rod 11 is formed with a loop portion 15 with which is engaged one end of a coil spring 16, the opposite end of this spring being secured to a wire hook 17 that is extended over the lowermost pet cock which cooperates with the spring 16 for maintaining the clamp 12 of said rod 11 in engagement with the flat-like operating knob of the pet cock 6.

Also in engagement with the said loop portion 15 is one end of a wire clip 18 that is carried by one end of a coil spring 19, the other end of which is secured to a wire link 20 that engages over the running board race rod 10. This spring 19 serves as a means for returning the rod 11 to its normal position for consequently closing the pet cock 6 when the said rod is released.

It will be noted from an inspection of Figure 1 of the drawings, that the spring 16 is anchored to the case 5 through the medium of the pet-cock 7, which case also carries the pet-cock 6, and in its action the spring 16 exerts a pull on the rod 11 for holding the U-shaped end 12 on the end of the rod in connection with the flat-like head or operating knob of the pet-cock 6, so that the anchor of the spring member is carried by the same part as the pet-cock 6 in order that vibration of the parts in use will not have the effect of overcoming the action of the spring 16 in performing its function, which it would have were it a compression spring having its anchors carried by the running board 8 which is subjected to substantial vibration in use relative to the crank case 5. A serious disadvantage has therefore been overcome in providing an anchor for the spring 16 adjacent the pet-cock 6 which acts in substantial alinement with the rod 11.

Numerous advantages of a device of this character will present themselves to those skilled in the art and even though I have herein set forth the most practical embodiment of the invention with which I am now familiar it is nevertheless to be understood that minor changes may be made therein without affecting the spirit and scope of the appended claim.

Having described my invention, what I claim and desire to secure by Letters Patent, is:—

Operating means for petcocks including a rod having a head for removable engagement with the operating knob of a crank case pet-cock at one end thereof, the other end of said rod extending through an opening in the running board structure of a vehicle providing a bearing therefor, and formed with an operating handle on the outer end thereof, resilient means secured to said rod intermediate its ends at one end thereof, and removably anchored at its other end to crank case carried projections adjacent the petcocks engaged by the head on said rod, whereby the resilient means being anchored adjacent the point of engagement of the head with the pet-cock will exert a pulling action on said rod in substantial alinement therewith for retaining the head in engagement with the operating knob of the pet-cock, and means secured to said rod and a suitable anchoring element for normally rotating the rod to move the pet-cock into closed position, said handle cooperating with a running board to form a stop for limiting the movement of said rod by the rotating means.

In testimony whereof I affix my signature.

RAY McNABB.